Patented Sept. 8, 1942

2,295,104

UNITED STATES PATENT OFFICE 2,295,104

MANUFACTURE OF NORMAL LEAD TRINITRORESORCINATE AND DOUBLE SALTS THEREOF

Frederick M. Garfield, St. Louis, Mo., assignor to Western Cartridge Company, East Alton, Ill., a corporation of Delaware No Drawing. Application June 29, 1939, Serial No. 281,818

11 Claims. (Cl. 260—435)

This invention pertains to the manufacture of normal lead trinitroresorcinate and novel double salts thereof.

The manufacture of normal lead trinitroresorcinate (or styphnate) has heretofore been described as involving the interaction of a solution of the lead salt of a strong inorganic acid, such as lead nitrate, with a solution of an alkali or alkaline-earth styphnate, in the presence of an organic acid. Prior attempts to obtain a suitable product more directly, for example with the use of free styphnic acid, have been unsuccessful.

Thus, it is stated in U. S. Patent 1,443,328, page 1, lines 52–57, "If any soluble lead salt, for instance, acetate of lead, is precipitated with trinitroresorcine or the soluble salts of the same, there will always be obtained only a mixture of a basic salt and free trinitroresorcine."

Contrary to this statement, I have found that normal lead trinitroresorcinate can advantageously be prepared by treating trinitroresorcin in suspension or solution with a solution of lead acetate or other lead salt of a weak organic acid, when precautions are taken in accordance with certain phenomena which I have discovered. Furthermore, the reaction may be utilized to prepare new double salts of normal lead trinitroresorcinate.

In accordance with this invention, generally stated, the said normal salt may be obtained by treating trinitroresorcin, in solution or suspension in a suitable liquid medium, with close to the theoretical proportion of a soluble lead salt of a weak organic acid. Preferably, the proportions are such as to provide at least one atom of lead per molecule of trinitroresorcin, and where an excess of lead salt is used, it should generally amount to less than ten to fifteen per cent when the normal salt is desired. The use of a larger excess of such lead salts has been found to cause the formation of novel explosive double salts of normal lead trinitroresorcinate, the properties of which make them suitable for use in various explosive compositions.

The following examples illustrate the preparation of normal lead trinitroresorcinate and double salts thereof in accordance with this invention.

Example I 816 grams of styphnic acid were suspended in 4500 c. c. of water in a suitable container by means of a mechanical agitator. The container was placed in a heating bath and the suspension was brought to a temperature of about 55° C. While maintaining this temperature and continuing the agitation, a lead acetate solution, prepared by dissolving 1260 g. of normal lead acetate trihydrate (Pb($C_2H_3O_2$)$_2$3$H_2O$) in 3000 c. c. of water and filtering, was added to the suspension at a uniform rate over a period of twelve minutes. After completing the addition, agitation was continued at 55° C. for a further period of five minutes, and the final result was a precipitate consisting of crystalline normal lead trinitroresorcinate. After cooling the suspension to about 25° C., the supernatant liquid was decanted, and the crystals were washed by agitation in fresh water, this process being repeated several times. A yield of 1450 grams (93.2% of theoretical) was obtained, the specific gravity of the crystals being measured as 3.086 at 30° C. and the lead content as 44.4% (theoretical—44.3%). The explosive properties of the product were likewise found to correspond with those of normal lead styphnate, the instantaneous flash point, for example, as measured on a Dennis heated bar melting point apparatus, being 325° C., as compared with 320°–330° C. for various samples of normaled styphnate prepared by interaction of sodium styphnate and lead nitrate in the presence of acetic acid. The crystals were characterized by a high degree of uniformity in size throughout the batch, were hexagonal in outline, had a length 2–4 times their width, and settled rapidly from suspension to form a paste containing less than 30% water.

A novel and surprising phenomenon observed during the course of the above procedure, to which many of the advantageous features of the process may be attributed, is the formation of a clear solution after about one-third to one-half of the lead acetate solution has been added. That this may consist of a colloidal solution, possibly of a lead acid styphnate, is indicated by the fact that when a portion is rapidly cooled to room temperature, a transparent elastic gel results. The intermediate formation of this clear solution is significant in that it enables the attainment of exceptional uniformity in the subsequent precipitation. A similar condition is realized with the use of other soluble lead salts of weak organic acids as described in subsequent examples.

Example II

A procedure identical with that of the first example was followed, excepting that a solution of basic lead acetate, having the composition Pb(OH)$_2$.Pb($C_2H_3O_2$)$_2$, was employed, in an amount which furnished the same weight of lead as utilized in the previous example. Normal lead styphnate, having an instantaneous flash point of 320° C., was obtained, the yield amounting to 95% of the theoretical.

Example III

A procedure identical with that of Example I was followed, excepting that twice the amount of lead acetate specified therein was added. It was found that the crystals of normal lead styphnate which were first formed became converted on further addition of lead acetate solution to elongated yellow crystals. This product was found on analysis to contain 52.9% lead, 15.2% carbon, and 5.3% nitrogen; when treated with concentrated sulfuric acid, acetic acid was liberated. The analysis and mode of formation indicate that this material is a hitherto unknown double salt of normal lead trinitroresorcinate and lead acetate, which corresponds to the formula $C_6H(NO_2)_3O_2Pb \cdot (C_2H_3O_2)_2Pb$ (theoretical content 53.4% lead, 15.5% carbon, and 5.4% nitrogen). Crystals of this double salt likewise result when previously prepared and washed normal lead trinitroresorcinate crystals are treated with lead acetate solution. The specific gravity of the crystals was found to be 3.1 at 30° C., and the instantaneous flash point was found to be 315° C. The material was found capable of being brought to explosion not only by the application of heat, but also to a desirable extent by shock and/or friction.

Example IV

A co-precipitated mixture of normal lead tritroresorcinate and normal lead trinitroresorcinate-acetate was obtained by the addition in ten minutes of a solution of normal lead acetate to a suspension of trinitroresorcin in water at 60° C., followed by agitation of the reaction mixture at that temperature for thirty minutes. The amounts were such as to provide 1.5 mols of lead per mol of trinitroresorcin. The normal lead trinitroresorcinate which was first precipitated was partly converted to crystals of the double salt, so that the final product after cooling and washing with water consisted of a mixture of the two types of crystals in close to equimolecular proportions. This was confirmed by the analysis of the product for its lead content, which was found to be 48.9% (theoretical 49.8%). The instantaneous flash point was found to be 320° C.

The conversion of normal lead styphnate crystals of double salt was found to require agitation for a length of time dependent on the amount of lead acetate present, the period being shorter when the amount was increased. At a temperature of 55° C., normal lead styphnate crystals appeared to be unchanged when held in contact with solutions containing less than one-tenth mol of lead acetate per mol of lead styphnate, while double salt crystals formed in 16 minutes when the molar ratio of lead styphnate to lead acetate was 2:1, and in 11 minutes at a 1:1 molar ratio.

Example V

To a suspension of trinitroresorcin in five times its weight of water at 60° C., there was added in ten minutes a solution containing substantially an equimolecular quantity of lead propionate in three times its weight of water. A clear solution was obtained when one-half to three-quarters of the latter solution had been added, this was then followed by precipitation of "gel" clusters, which soon thereafter became transformed to crystals of normal lead trinitroresorcinate. After a digestion period of five minutes after completing the addition, the suspension was cooled to room temperature and the crystals were washed with pure water. An 89% yield of normal lead trinitroresorcinate was obtained, and the product was found on analysis to contain 44% lead and to have an instantaneous flash point of 330° C.

Example VI

The procedure of the preceding example was repeated, with the use, however, of more than twice the amount of lead propionate relative to the trinitroresorcin. Normal lead trinitroresorcinate crystals were precipitated when about one-half the propionate solution had been added, and conversion of these crystals to elongated yellow crystals occurred when about three-fourths of the solution had been added. The mixture was digested for an hour at 60° C., the suspension was then cooled, and the crystals were filtered and washed. The lead content of the product was found on analysis to be 51.1% (theoretical for $C_6H(NO_2)_3O_2Pb \cdot (C_3H_5O_2)_2Pb$ is 51.5%), and the instantaneous flash point was 310° C. This product is thus a new explosive derivative of normal lead trinitroresorcinate, a crystalline double salt thereof with lead propionate. It was found to be insoluble in alcohol, ether, and acetone and somewhat soluble in water.

Example VII

The procedure of Example V was repeated, with the substitution of lead lactate for the propionate. The product consisted of crystalline normal lead styphnate having an instantaneous flash point of 335° C. and found by analysis to contain 43.9% lead.

When the reaction between trinitroresorcin and lead acetate or similar lead salt is carried out at 20°–25° C., the first precipitate obtained consists of a gelatinous fibrous material, probably normal lead trinitroresorcinate dihydrate, which after a period of about thirty minutes becomes completely converted into crystals which correspond in properties to the form which has been described in the literature as the monohydrate. As the reaction temperature is raised, the time required for converting the fibrous precipitate to crystals of monohydrate becomes shorter, so that when the reaction is carried out at temperatures above about 60° C., no substantial amounts of this intermediate fibrous precipitate are noticeable.

Most favorable results in preparing the normal salt in a form suitable for use in explosive compositions appear to be obtainable at reaction temperatures between about 40° C. and 70° C., since lower temperatures require a fairly long precipitation period while higher temperatures may lead to undesirably large crystals. The reaction may be carried out at a constant temperature or at temperatures which are varied according to some fixed schedule, as desired. The concentrations and the rate as well as order of addition are likewise subject to controlled variation by those skilled in the art. It may furthermore be desirable at times to add a small amount of a substance adapted to control the growth of the resulting crystals, such as, for example, gum arabic. The trinitroresorcin may be the pure acid, characterized by a light yellow color, or it may consist of the brown-colored acid, containing one or more compounds resulting from the interaction of resorcin with oxides of nitrogen and subsequent nitration. However, use of the latter appears generally less desirable due to a tendency toward the formation of misshapen crystals or of crystal clusters.

In carrying out the manufacture of normal lead trinitroresorcinate, the observance of precautions appropriate to the highly explosive nature of the product is desirable. The simplicity of my improved process is beneficial in this respect as facilitating the employment of remote control. The reaction vessel employed should be one with a smooth surface having no tendency to promote the formation of a crust of precipitate thereon.

In contrast to the successful results described above, it was observed that no useful product was obtainable when trinitroresorcin was treated with solutions of lead salts of strong acids, such as lead nitrate, the trinitroresorcin remaining substantially unchanged after treatment.

In general, therefore, excellent yields and quality of crystalline normal lead trinitroresorcinate may be obtained in accordance with this invention by interacting trinitroresorcin directly with a solution of a lead salt having properties similar to the salts specifically mentioned herein. These are lead salts of weak acids, such as the lower aliphatic and substituted aliphatic acids, which are much weaker acids in aqueous solution than trinitroresorcin, the latter being characterized as a strong acid. These suitable lead salts are further characterized by appreciable solubility in the liquid reaction medium. A solubility of the order of several per cent is sufficient, as indicated by the fact that excellent results were obtained in the procedure of this invention with the utilization of lead formate, which is soluble in water only to the extent of 2.8% at 25° C. and 18% at 100° C.

As indicated above, the process of this invention may likewise be utilized in the preparation of novel double salts of normal lead trinitroresorcinate with lead salts of weak organic acids, such as the lower aliphatic acids. These new derivatives of normal lead trinitroresorcinate are well qualified because of their properties for use in explosive and deflagrating compositions, such as blasting cap ignition compositions and ammunition priming mixtures wherein one or more of them may be combined with well known initiating explosives such as mercury fulminate, lead azide, lead picrate, and diazodinitrophenol, with oxidizing agents such as metallic nitrates, dioxides, chromates and permanganates, and/or fuels such as sulphides, thiocyanates, and silicides.

By this invention there is thus provided a new and improved process for the manufacture of normal lead trinitroresorcinate, which process is characterized by ease and economy of operation, simplicity of control, high yield and uniformity of product, as well as the advantageous feature of providing a relatively large amount of product for a given volume of reaction liquid. Furthermore, the process is capable of yielding novel explosive derivatives of normal lead trinitroresorcinate.

The chemical reactions which occur in the preparation of normal lead trinitroresorcinate and a double salt, respectively, may be written as follows, when, for example, normal lead acetate is used:

$$C_6H(NO_2)_3(OH)_2 + Pb(C_2H_3O_2)_2 = $$
$$C_6H(NO_2)_3O_2Pb + 2HC_2H_3O_2$$
$$C_6H(NO_2)_3O_2Pb + Pb(C_2H_3O_2)_2 = $$
$$C_6H(NO_2)_3O_2Pb \cdot Pb(C_2H_3O_2)_2$$

It is to be understood that the specific details hereinbefore described are to be taken as illustrative and not as limiting the scope of the invention, and that variations which may be realized by those skilled in the art are included within the language of the appended claims.

I claim:

1. In the manufacture of a normal lead salt of trinitroresorcin, the process comprising interacting trinitroresorcin and at least an equimolal quantity of lead acetate.

2. In the manufacture of a normal lead salt of trinitroresorcin, the process comprising interacting trinitroresorcin and a solution of a lead salt of a lower aliphatic acid in proportions to provide one to about two mols of lead per mol of trinitroresorcin.

3. In the manufacture of a normal lead salt of trinitroresorcin, the process comprising interacting trinitroresorcin and a solution of substantially one to two molecular equivalents thereof of lead acetate at a temperature of 40° C. to 70° C.

4. In the manufacture of a normal lead salt of trinitroresorcin, the process comprising interacting trinitroresorcin and a solution of substantially one to two molecular equivalents thereof of lead acetate at a temperature of about 55° C.

5. In the manufacture of a normal lead salt of trinitroresorcin, the process comprising forming a suspension of trinitroresorcin, heating the suspension to 40°–70° C., and adding thereto a solution of a lead salt of a lower aliphatic acid in an amount to provide one to about two mols of lead per mol of trinitroresorcin.

6. In the manufacture of a normal lead salt of trinitroresorcin, the process comprising forming a suspension of trinitroresorcin, admixing therewith a solution of a lead salt of a lower aliphatic acid to form a clear solution, and forming a precipitate by adding a further amount of the lead salt solution.

7. In the manufacture of a normal lead salt of trinitroresorcin, the process comprising forming a clear solution by the admixture of trinitroresorcin and a lead acetate solution at a temperature between 40° C. and 70° C., and forming a precipitate by adding to said solution a further amount of lead acetate solution.

8. As a new product, a crystalline double salt of normal lead trinitroresorcinate and lead acetate.

9. As a new product, a crystalline double salt of normal lead trinitroresorcinate and lead propionate.

10. As a new product, a crystalline double salt of normal lead trinitroresorcinate and a soluble lead salt of a lower aliphatic acid.

11. In the manufacture of a normal lead salt of trinitroresorcin, the process comprising interacting trinitroresorcin and at least an equimolal quantity of a soluble lead salt of a lower aliphatic acid.

FREDERICK M. GARFIELD.